Feb. 6, 1934.  A. H. KENNEDY  1,946,426
METHOD AND APPARATUS FOR SETTING SAWS
Filed Nov. 11, 1933
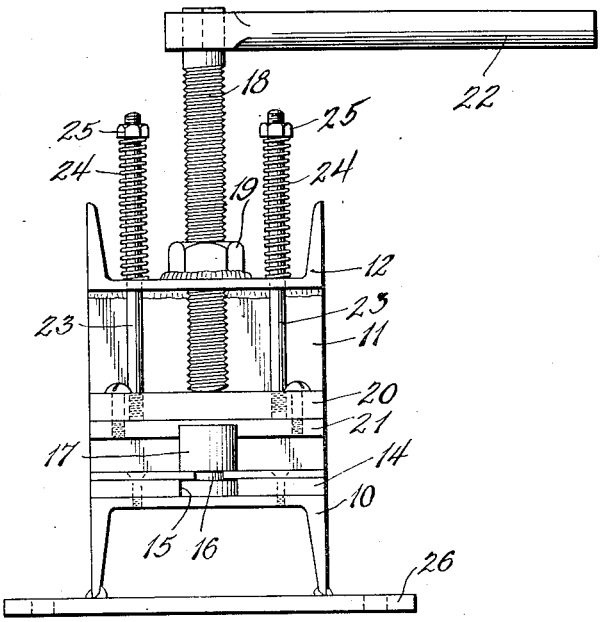
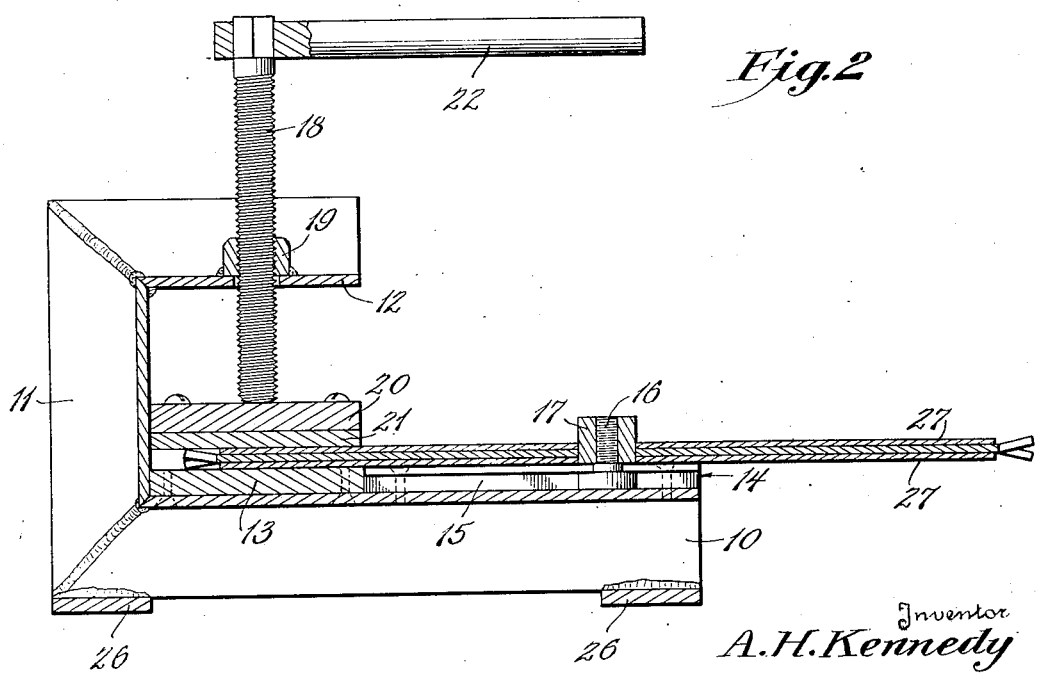
Inventor
A. H. Kennedy
By A. D. Adams
Attorney Patented Feb. 6, 1934

1,946,426

UNITED STATES PATENT OFFICE 1,946,426

METHOD AND APPARATUS FOR SETTING SAWS

Albert H. Kennedy, Rockport, Ind.

Application November 11, 1933
Serial No. 697,663

4 Claims. (Cl. 76—58)

This invention relates to a method and apparatus for setting saws and, among other objects, aims to provide a new mode of alining and shaping the teeth of circular saws and the like so that the front edge of each tooth forms a cutting edge and its back edge a raker edge, whereby the saw cuts a smooth, clean cut. Also, the invention contemplates a greatly simplified and relatively cheap device for shaping and bringing the set teeth of a saw into perfect line.

Other aims and advantages of the invention will appear in the specification, when considered in connection with the accompanying drawing, wherein:

Fig. 1 is a front elevation of one form of apparatus for practicing the method; and Fig. 2 is a vertical longitudinal sectional view of the device shown in Fig. 1.

In setting saws by the ordinary methods, it is practically impossible to bring the teeth into exact alinement to make a clean cut. Some of the teeth are always off-set more than the others. It is the purpose of this invention to provide ways and means to aline the teeth on each side after they are set by any of the ordinary methods so that the saw will cut a kerf as smooth as that of the expensive planer saws.

In accordance with my method, the teeth are first set by any ordinary means such as the usual saw setting tools. They are then brought into perfect alinement by placing the saw in a clamping device having a plane table or platen. The desired clearance is determined and a disk of the same thickness as the clearance required and of such diameter that its peripheral edge comes just inside of the base of the teeth, is placed on the platen or table. The saw is then laid on the disk and another disk of the same size and thickness is placed on top of the saw. The teeth are then subjected to clamping pressure by means of a screw operated clamp plate and a base block. The clamping device is arranged to engage the opposite sides of the two disks and presses the teeth into alinement as clearly indicated in Fig. 2. After this is done, the burrs that may have been made when the saw was sharpened, are removed by a hard carborundum stone or hone which is rubbed gently around the teeth before the plates are removed. In this operation, the teeth should be barely touched because a microscopic point of any circular saw does all of the cutting.

A general-purpose saw usually has about three teeth to the inch with the front edge of each tooth straight toward the center. It is usually filed with a three-cornered file so that its front edge is about 45° to the plane of the saw and the back edge is straight across. This makes the front edge a cutting edge and the back edge of every tooth is a raker.

Referring particularly to the drawing, the apparatus is shown as embodying a base preferably made of a piece of structural channel iron 10 to which is welded an upright channel 11 and an overhanging channel 12 as clearly shown in Fig. 2. On the base portion there is secured a machined clamping block or plate 13 and a pair of platen members 14 having a longitudinal T-slot 15 therebetween to receive the head of a screw threaded pin 16 carrying a round clamping nut 17 of such size as to fit in the hole of an ordinary circular saw. This head clamps the screw in the slot to receive saws of different diameters.

A clamping screw 18 is shown as being threaded through a nut 19 which is suitably secured to the web of the overhanging channel 12. The lower end of the screw acts against a clamping member 20 carrying a machined clamping plate 21 which cooperates with the clamping block or the plate 13. The clamping screw is adapted to be turned by an ordinary handle 22.

Referring to Fig. 1, the clamping member 20 is guided by a pair of upstanding guide rods 23 at its opposite sides which extend through holes in the web of the overhanging channel member 12. These rods are conveniently screw-threaded into the clamping member and project well above the upper side of the overhanging member, each having a screw-threaded end portion. Compression springs 24 are confined between the web and nuts 25 on the rods so that they normally lift the clamping member as the screw is turned to release the clamp.

In some instances, it is desirable to secure the device to a table or bench. For this purpose, a pair of base plates in the form of strap members 26 are welded across and extend beyond the flanges of the base channel 10 and each of these members has an opening to receive a bolt or lag screw.

To press the teeth of a particular saw into alinement, the required clearance is measured or determined and a disk or plate 27 having the same thickness as the clearance required and such a diameter as to come within the bases of the teeth is first placed on the nut. The saw is then placed on the disk 27 and another disk 27 of the same thickness and diameter is placed on top of the saw. Clamping pressure is then applied until the machined base plate and clamping plate firmly grip the two disks so that the teeth of the saw are confined between the machined surfaces of the plates and pressed into line. The clamp is released slightly so that the saw can be turned and the operation is repeated until all of the teeth around the periphery of the saw are pressed into exact alinement. After this is done, the saw may be turned on its arbor or pin and the side edges of the teeth gently honed or touched up to remove any feather edges that might have been left by the file. In some instances, it is contemplated that a strip of sheet metal or the like, the thickness of which is equal to the required clearance of the teeth on each side, may be glued to one side of the hone or secured to one side of a fine flat file and rubbed over the surface of the saw so as to hone or file off the burrs uniformly, thereby providing razor edges on all of the teeth. The saw is then ready for use and will produce a kerf cut practically as smooth as that of a far more expensive planer saw.

Having thus described one embodiment of the invention and the mode of practicing the method, with the understanding that the claims are not limited to a strict conformity therewith, what I claim and desire to secure by Letters Patent is:

1. That method of alining the set teeth of circular saws which consists in placing disks on opposite sides of the saw each having a thickness equal to the required offset of the teeth and its edge lying within the bases of the teeth, and confining the teeth between clamping members which engage said disks, whereby the cutting edges of all of the teeth are brought into the planes of said disks.

2. That method of alining the set teeth of circular saws which is characterized by determining the required offset of the teeth; placing on opposite sides of the saw a pair of disks each of a thickness equal to the amount of offset and having their peripheral edges coming within the bases of the teeth; confining the saw and the disks between a pair of machined clamping members so that the clamping members engage said disks and bring the teeth into perfect line in the planes of said disks; and honing off the burred or feather edges of the teeth before the disks are removed.

3. A device for alining the offset teeth of circular saws which comprises, in combination, a holder for the saw; a pair of disks engaging opposite sides of the saw and each having a thickness equal to the required offset of the teeth; and a pair of machined clamping members adapted to engage the opposite sides of the teeth and both of said disks so as to bring the teeth into the planes of the disks.

4. A device for alining the offset teeth of circular saws comprising, in combination, a base member having a longitudinal T-slot therein; an adjustable bolt having a head slidably engaging said T-slot and a clamping nut adapted to fit within the opening of a saw; a clamping block secured to the base; an upright bracket secured to the base; an overhanging member mounted on the upright; a screw clamping member carried by the overhanging member; and a machined clamping plate carried by the screw clamping member cooperating with the clamping block; and a pair of disks each of a diameter less than the diameter of the saw and of a thickness equal to the required offset of the teeth, whereby the clamping members, upon engaging the disks, bring the teeth into line on opposite sides of the saw.

ALBERT H. KENNEDY.